United States Patent Office 3,326,755
Patented June 20, 1967

3,326,755
ALGINATE CONTAINING ANTACID
COMPOSITIONS
Bhogilal B. Sheth, Dover, N.J., assignor to Warner-Lambert Pharmaceutical Company, Morris Plains, N.J., a corporation of Delaware
No Drawing. Filed June 15, 1965, Ser. No. 464,215
8 Claims. (Cl. 167—55)

This invention relates to a method for improving the palatability of certain antacid compositions and relates more particularly to a method for improving the palatability of aqueous antacid compositions by masking their grittiness and astringency.

Antacids are therapeutic agents which lower the acidity of gastric contents. They are prescribed in the treatment of clinical manifestations such as hyperchlorhydria and peptic ulcer.

For all routine long term or continued antacid medication, the salts or hydroxides of aluminum, calcium and magnesium either alone or in combination are recommended. Compositions containing these salts are usually administered orally in a suitable dosage form such as an aqueous suspension and exert their antacid action by neutralizing and adsorbing gastric acidity. These salts or hydroxides of aluminum, calcium and magnesium generally occur in the form of gritty water insoluble powders. When they are suspended in a suitable vehicle for oral administration, they retain their inherent grittiness. This gritty feeling is not well tolerated and is a cause of many consumer complaints. In addition, aluminum ion is well known for the astringent effect it produces which makes oral suspensions containing aluminum ion somewhat unpalatable. The unpalatability of these aqueous compositions is a distinct drawback to their use. Furthermore, because of the fact that most patients suffering from gastric hyperacidity are required to take these medications continuously, their unpalatability is an obvious disadvantage.

Accordingly, a primary object of this invention is to provide a novel method for the production of aqueous antacid compositions having substantially reduced grittiness and having an improved mouth feel.

Another object of this invention is to provide a novel method for the production of aqueous antacid compositions having improved acid combining capacity.

Other objects of this invention will appear from the following detailed description.

It has now been found that the aforementioned objects can be attained by the incorporation of alginic acid or alginates such as propylene glycol alginate or sodium alginate into aqueous antacid compositions of the nature described.

Broadly speaking, the incorporation of alginic acid or alginates such as propylene glycol alginate of up to 0.2 to 1.8 parts by weight into antacid compositions containing as active ingredients aluminum hydroxide in combination with a magnesium salt such as magnesium trisilicate, magnesium hydroxide, magnesium carbonate or magnesium oxide and a small concentration of sodium salts results in the production of a composition having very pleasant mouth feel. Both the grittiness and astringency which are commonly encountered in these compositions as they previously existed are entirely eliminated. The sodium salts which may be advantageously employed may be present in the form of the sodium salts of the synthetic sweeteners employed such as, for example, saccharine sodium or sodium cyclamate or the sodium salts present may be incorporated as the salt of the preservative present such as sodium benzoate. In place of sodium salts, ammonium or potassium salts may also be employed. Trace amounts of calcium salts may also be employed in conjunction with the above described salts. These salts are incorporated at a range between 0.1% to 5% by weight. The alginates are available commercially in various viscosity grades and any suitable alginate may be used. The addition of alginates or alginic acid to these aqueous antacid compositions results in a reduction in viscosity. This effect is indeed quite unexpected inasmuch as alginates are usually added to pharmaceuticals to increase viscosity. In the present instance, quite the contrary is observed and the resulting product not only has lower viscosity, but also exhibits a very unusual and desirable milk-like smoothness.

The antacid compounds preferably used in the forming of the alginate modified products of this invention are the aluminum and magnesium antacid compounds. Some of these antacid compounds, such as aluminum hydroxide and magnesium hydroxide, for example, are commercially available as dry powders or as wet cakes. The wet cake form is generally the preferred one to use in liquid products because of its final particle size and ease of handling when in the form of liquid preparations. The aluminum hydroxides used in these antacid compositions are available in a plurality of physical forms with somewhat varying properties. A preferred form of aluminum hydroxide which may be used in the antacid compositions of this invention is a nonreactive aluminum hydroxide wet cake, which on digestion in artificial gastric fluid, U.S.P., is not completely soluble but leaves a colloidal residue.

The antacid compositions of this invention may include flavoring agents such as peppermint or orange flavor, oil of wintergreen and the like. They may also include other therapeutic agents, for example, anticholinergics such as atropine, antisecretory agents such as triamypyzine, DL–4–benzamido N,N-diphenyl glutaramic acid of the formula:

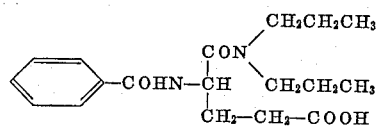

tranquilizers such as 1,4-benzodiazepines and the like. Other antacid agents such as chitosan, casein and the like may also be included.

The practice of this invention is illustrated by the following examples. The viscosity given for each of the compositions noted is determined using a Brookfield viscometer.

EXAMPLE 1

|  | A | B |
|---|---|---|
| Non-reactive Aluminum Hydroxide Wet Cake, gm | 410 | 410 |
| Magnesium Trisilicate, gm | 128 | 128 |
| Sodium Saccharin, gm | 0.127 | 0.127 |
| Sodium Benzoate, gm | 0.75 | 0.75 |
| Peppermint Flavor, ml | 0.12 | 0.12 |
| Alginic Acid, gm | 12 |  |
| Water q.s., ml | 1,000 | 1,000 |

Each of the above compositions A and B is prepared by dispersing the respective ingredients in water and then passing the resulting mixture through a homogenizer. Composition A, containing the added alginic acid, is found to have a viscosity of 90 cps. whereas composition B containing no alginic acid has a viscosity of over 1300 cps. In addition, it is also observed that when composition A is administered orally, it is found to have a very desirable milk-like smoothness on the tongue.

EXAMPLE 2

|  | A | B |
|---|---|---|
| Non-reactive Aluminum Hydroxide Wet Cake, gm | 410 | 410 |
| Magnesium Trisilicate, gm | 128 | 128 |
| Sodium Saccharin, gm | 0.127 | 0.127 |
| Sodium Benzoate, gm | 0.75 | 0.75 |
| Peppermint Flavor, ml | 0.12 | 0.12 |
| Propyleneglycol alginate, gm | 15 |  |
| Water q.s., ml | 1,000 | 1,000 |

Compositions A and B are prepared in an analogous fashion to the manner described in Example 1. Composition A containing propyleneglycol alginate is found to have a viscosity of 300 cps. whereas composition B, which contains no propyleneglycol alginate, has a viscosity of 1300 cps.

EXAMPLE 3

|  | A | B |
|---|---|---|
| Non-reactive Aluminum Hydroxide Wet Cake, gm | 328 | 328 |
| Magnesium Trisilicate, gm | 103 | 103 |
| Magnesium Hydroxide Magna, gm | 100 | 100 |
| Sodium Benzoate, gm | 0.75 | 0.75 |
| Sodium Saccharin, gm | 0.127 | 0.127 |
| Peppermint Flavor, ml | 0.12 | 0.12 |
| Alginic Acid, gm | 12 |  |
| Water q.s., ml | 1,000 | 1,000 |

In a fashion analogous to that described in Example 1, compositions A and B are prepared. Composition A is found to have a viscosity of 80 cps. whereas composition B which contains no alginic acid has a viscosity of 1200 cps.

It is to be understood that the foregoing detailed description is given merely by way of illustration and that many variations may be made therein without departing from the spirit of my invention.

Having described my invention, what I desire to secure by Letters Patent is:

1. An orally administered antacid composition which comprises from about 0.2 to 1.8 parts by weight of an alginate selected from the group consisting of propylene glycol alginate and sodium alginate, and the combination of aluminum hydroxide with magnesium trisilicate, magnesium hydroxide, magnesium oxide or magnesium carbonate.

2. A composition according to claim 1 wherein said alginate is propyleneglycol alginate.

3. A composition according to claim 1 wherein said alginate is sodium alginate.

4. An orally administered antacid composition which comprises from about 0.2 to 1.8 parts by weight of alginic acid or an alginate selected from the group consisting of propylene glycol alginate and sodium alginate, and the combination of aluminum hydroxide with magnesium trisilicate, magnesium hydroxide, magnesium oxide or magnesium carbonate and a small amount of the sodium, potassium, calcium or ammonium salt of saccharine, cyclohexane-sulfamic acid or benzoic acid.

5. An orally administered antacid composition which comprises from about 0.2 to 1.8 parts by weight of an alginate selected from the group consisting of propylene glycol alginate and sodium alginate, and the combination of non-reactive aluminum hydroxide wet cake with magnesium trisilicate, magnesium hydroxide, or magnesium oxide.

6. A composition according to claim 5 wherein said alginate is propyleneglycol alginate.

7. A composition according to claim 5 wherein said alginate is sodium alginate.

8. An orally administered antacid composition which comprises from about 0.2 to 1.8 parts by weight of alginic acid or an alginate selected from the group consisting of propylene glycol alginate and sodium alginate, and the combination of non-reactive aluminum hydroxide wet cake with magnesium trisilicate, magnesium hydroxide, magnesium carbonate or magnesium oxide and containing a small amount of the sodium, potassium, calcium or ammonium salt of saccharine, cyclohexanesulfamic acid or benzoic acid.

References Cited
UNITED STATES PATENTS 2,836,540    1958    Hardt _____ 167—55

ALBERT T. MEYERS, *Primary Examiner.*

SHELDON J. SINGER, *Assistant Examiner.*